United States Patent
Kressmann et al.

(10) Patent No.: US 6,842,212 B2
(45) Date of Patent: Jan. 11, 2005

(54) LIQUID CRYSTAL DISPLAY

(75) Inventors: Frank Kressmann, Schwalbach (DE); Dietrich Lubs, Bad Homburg (DE); Waltraut Müller, Kriftel (DE)

(73) Assignee: Braun GmbH, Frankfurt am Main (DE)

(*) Notice: Subject to any disclaimer, the term of this patent is extended or adjusted under 35 U.S.C. 154(b) by 241 days.

(21) Appl. No.: 09/929,679

(22) Filed: Aug. 14, 2001

(65) Prior Publication Data

US 2002/0021394 A1 Feb. 21, 2002

(30) Foreign Application Priority Data

Aug. 14, 2000 (DE) .......................................... 100 40 274

(51) Int. Cl.[7] .......................................... G02F 1/1343
(52) U.S. Cl. ...................... 349/139; 349/140; 349/147; 349/154
(58) Field of Search .................. 349/139, 140–143, 349/146, 147, 154

(56) References Cited

U.S. PATENT DOCUMENTS

| | | | |
|---|---|---|---|
| 4,114,890 A | 9/1978 | Yamamoto | |
| 4,244,635 A | * 1/1981 | Sasaki et al. | 350/336 |
| 4,955,698 A | * 9/1990 | Knoll et al. | 350/336 |
| 5,355,251 A | 10/1994 | Parks | |
| 5,475,516 A | 12/1995 | Yoshizawa et al. | |
| 5,535,028 A | 7/1996 | Bae et al. | |

FOREIGN PATENT DOCUMENTS

| | | |
|---|---|---|
| DE | 3732982 A1 | 4/1989 |
| DE | 3806843 A1 | 9/1989 |
| WO | WO 99/06984 | 2/1999 |

OTHER PUBLICATIONS

European Search Report (in German), Nov. 19, 2001.

* cited by examiner

Primary Examiner—Carl Whitehead, Jr.
Assistant Examiner—Yennhu B. Huynh
(74) Attorney, Agent, or Firm—Morgan, Lewis & Bockius, LLP

(57) ABSTRACT

The invention is directed to a liquid crystal display having two opposed substrates, a liquid crystalline medium contained between the substrates, and a plurality of electrodes arranged on the substrates to produce a multiplicity of pixels. According to the invention, the electrodes are configured in such fashion that the pixels have round contours. The pixels may also have contours in the form of a polygon with more than four sides. Preferably pixels with roughly circular contours are produced.

19 Claims, 5 Drawing Sheets

LIQUID CRYSTAL DISPLAY

FIELD OF THE INVENTION

This invention relates to a liquid crystal display having two opposed substrates, a liquid crystalline medium contained between the substrates, and a plurality of electrodes arranged on the substrates to produce a multiplicity of pixels.

BACKGROUND OF THE INVENTION

Liquid crystal displays, also referred to as LCDs, are known in a variety of configurations and are increasingly used for displaying a wide variety of information types. Specifically when employed in electronic appliances for personal use, it is necessary for such liquid crystal displays to be built to small dimensions because of the requirement for the appliances for personal to be built to small dimensions as well. Accordingly, the demands placed on the resolution of such liquid crystal displays are high to achieve good readability while yet the display areas have a small format only. Conventional liquid crystal displays of the dot-matrix type have difficulty satisfying these requirements. Particularly the representation of graphics with curved contours is a task difficult to accomplish. The trend has been heretofore toward an increase in the resolution of the liquid crystal displays by making the pixels smaller. However, a denser raster of smaller pixels gives rise to a variety of technical problems and incurs significantly higher cost, particularly for the drive unit for the liquid crystal display. The readability of such liquid crystal displays is nevertheless limited.

SUMMARY OF THE INVENTION

It is therefore an object of the present invention to provide an improved liquid crystal display of the type initially referred to, which avoids the disadvantages of the prior art, improving upon it in advantageous manner. In particular it is an object to achieve improved readability using simple means.

To accomplish this object the present invention proposes liquid crystal displays according to the patent claims 1 and 8. Preferred embodiments of the invention are the subject-matter of the subclaims.

According to the invention provision is therefore made for the pixels generated by the electrodes to have round contours—in particular at least in part. In contrast to the square or rectangular pixels heretofore used, pixels with a bead-shaped contour largely devoid of corners are apt to improve the readability significantly. Instead of adopting the current development trend toward ever smaller pixels and raster units, the present invention hence proceeds to substitute pixels with rounded contours or shapes approximated to rounded contours for the square or rectangular pixels known in the art. Surprisingly, this simple approach enhances the readability of the displayed information considerably, particularly in cases where curve-type representations are involved, as for example the representation of the figure "9" or the letter "B" which contain radii. Good readability is, of course, an important aspect for relatively small displays of the type used, for example, in blood pressure monitoring devices which are hence considered a particularly important field of application though not the only one.

A preferred embodiment of the invention comprises the generation of pixels with circular contours whereby curved shapes of graphs and the like can be represented in particularly good quality.

According to a further aspect of the present invention, pixels having a contour in the shape of a polygon with more than four sides are generated. Preferably polygons with an even number of sides are generated. In particular the electrodes are configured in such manner as to provide the pixels with an octagonal contour. By providing the polygon pixels with six sides, preferably eight sides, their contour is approximated to a round shape. In particular pixels in the form of a traverse can be generated, whose corners lie on a circle so that the perceivable contour shape of the pixels is a near approximation to the circular shape. This enables good readability to be achieved with pixels of a size affording still economy of manufacture.

In a further feature of the invention provision can be made for mixed shapes, comprising pixels with round contours and pixels with polygonal contours. In particular all or individual pixels may have a contour in the shape of a polygon with rounded corners or a traverse comprised of curve sections. To achieve a full pixel form which approximates to the shape of a circle, provision may be made for neighboring sides of the polygonal contours of the pixels to define between them an internal angle of $\geq 100$ degrees, preferably $\geq 120$ degrees.

To produce pixels with round contours, in a further feature of the invention the electrodes mounted on the substrates are correspondingly shaped. In particular the electrodes possess bulging sections with a convex outer contour, as well as connecting sections linking said bulging sections in a string-type configuration, with the relative orientation of the electrodes disposed on different substrates being such that the bulging sections lie opposite each other. Preferably the bulging sections are arranged in succession in the manner of a string of beads, with the rows on one substrate intersecting the rows on the other substrate preferably at right angles. The strings hence extend in different directions on different substrates. In this arrangement the shape of the pixels is defined by the overlap of the intersecting electrodes so that the bulging sections of opposite electrodes complement each other. This enables manufacturing variations in the shift of the upper substrate relative to the lower substrate in the x and y direction—hence in both directions normal to each other in one plane—to be compensated for optimally, producing as the result, meaning in the overlap of both substrates, still roundish pixels.

To provide the pixels with rounded, particularly circular contours, the bulging sections of the electrodes may be provided with a rounded, in particular circular-segmental, outer contour.

To obtain pixels with the polygonal contours described, it is possible for the outer contour of the electrodes to have their bulging sections shaped in a polygonal, in particular octagonal, configuration. If desired, the corners of the polygonal outer contour may be rounded. It will be understood that it is also possible for the electrodes on one substrate to be provided with bulging sections of a round, in particular circular configuration, while the electrodes on the other substrate have bulging sections with a polygonal outer contour.

Considering that the contours of the pixels are defined by the overlap of the electrodes' bulging sections lying on the opposite substrates, it is not necessary for the bulging contours to match perfectly with the desired contours of the pixels. In particular the bulging sections of the electrodes may form diametrically opposed sectors, particularly circular sectors and/or polygonal sectors, with a sector angle of at least 90 degrees, approximately. The diametrically opposing sectors on the one substrate and the likewise diametrically opposing sectors, turned through one quadrant, on the other substrate are complementary, so that all four quadrants are overlapped. In a circular sectoral configuration the overlapping electrodes add up to a circle, defining a circular pixel.

In a further feature of the invention the connecting sections between the bulging sections of the electrodes outside the area of overlap with the opposite electrode may have an enlarged cross-section. This results in a reduced resistance in the electrodes. The shape of the pixels is not affected thereby because the enlarged cross-section is provided outside the area of overlap of opposite electrodes.

It will be understood that it is possible for the pixels to be of varying size and arranged at different raster distances. According to an advantageous embodiment of the invention the raster distance between neighboring pixels is between 0.5 and 1 mm, preferably between 0.6 and 0.8 mm. In particular the raster distance according to one embodiment of the invention may be of the order of 0.7 mm, meaning that about 1.4 pixels per millimeter are provided.

The liquid crystal display affords particular advantages when used in combination with electrical appliances for personal use having a relatively small display area, particularly blood pressure monitoring devices. In spite of its small size and small display area (less than 8×6 cm$^2$), in particular between 8 cm$^2$ and 80 cm$^2$, the configuration of the liquid crystal display of the invention makes it possible to accomplish an excellent readability of the information to be displayed such as numbers, letters, time curves of magnitudes, graphs and the like, without such readability being adversely affected by an axial offset of the opposed substrates caused by manufacturing tolerances.

BRIEF DESCRIPTION OF THE DRAWINGS

Preferred embodiments of the present invention will be explained in more detail in the following with reference to the accompanying drawings. In the drawings.

DETAILED DESCRIPTION OF THE PREFERRED EMBODIMENTS

Figure 1:
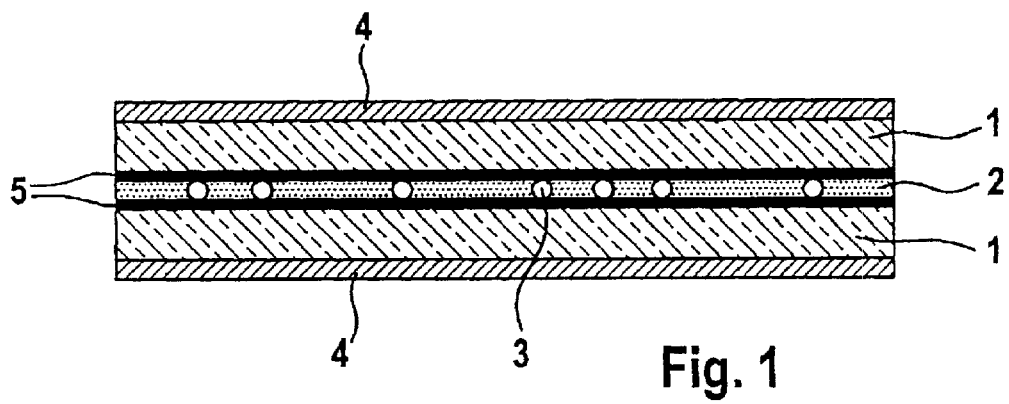
FIG. 1 is a schematic sectional view of a liquid crystal display illustrating a preferred embodiment of the invention.

According to FIG. 1 the liquid crystal display includes as substrates two superposed sheets of glass 1 or some other plane and transparent sheets arranged at a small relative distance. Contained between the two sheets of glass 1 are a liquid crystalline medium 2 and optically neutral, meaning transparent, spacers 3 distributed in a non-uniform pattern.

Applied in conventional manner to the surfaces of the two sheets of glass 1 facing away from each other is a respective polarizer 4, for example, in the form of a polarizing film, in order to suitably polarize the light passing through the sheets of glass 1.

Disposed on the surfaces of the sheets of glass 1 facing each other are electrodes 5. The electrodes are transparent and may be vapor-deposited in the form of an electrically conductive indium-titanium-oxide coating.

Figure 2A:
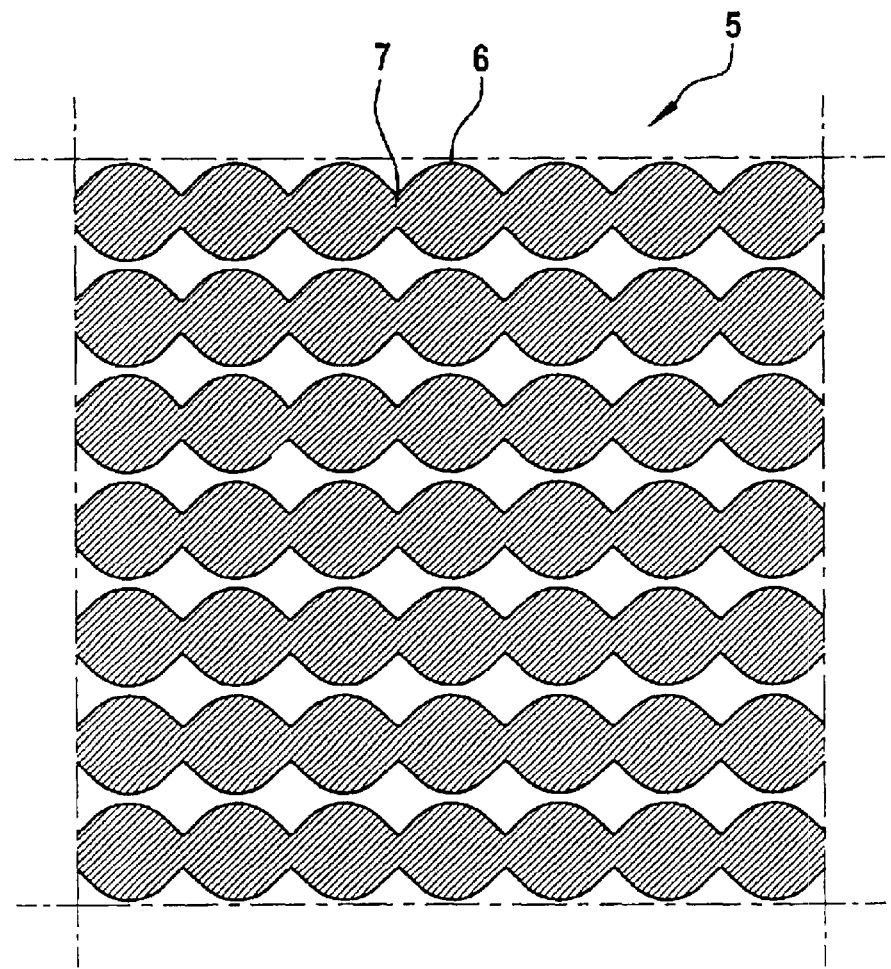
FIG. 2a is a top plan view of the electrodes applied to a first substrate, showing their orientation and shape.

FIG. 2a shows a top plan view of the conducting tracks or electrodes 5 vapor-deposited upon a first one of the two sheets of glass 1 or substrates. The electrodes 5 are arranged in a straight-line configuration. The width of the conducting tracks 5 is not constant along their course, however. They have successive bulging sections 6 so that the cross-section of each conducting track becomes wider and narrower in cycles. This provides each conducting track with a contour similar to a string of beads, with the bulging sections 6 being arranged in a regular raster, that is, the bulging sections 6 of adjacent conducting tracks define a straight line.

Figure 2B:
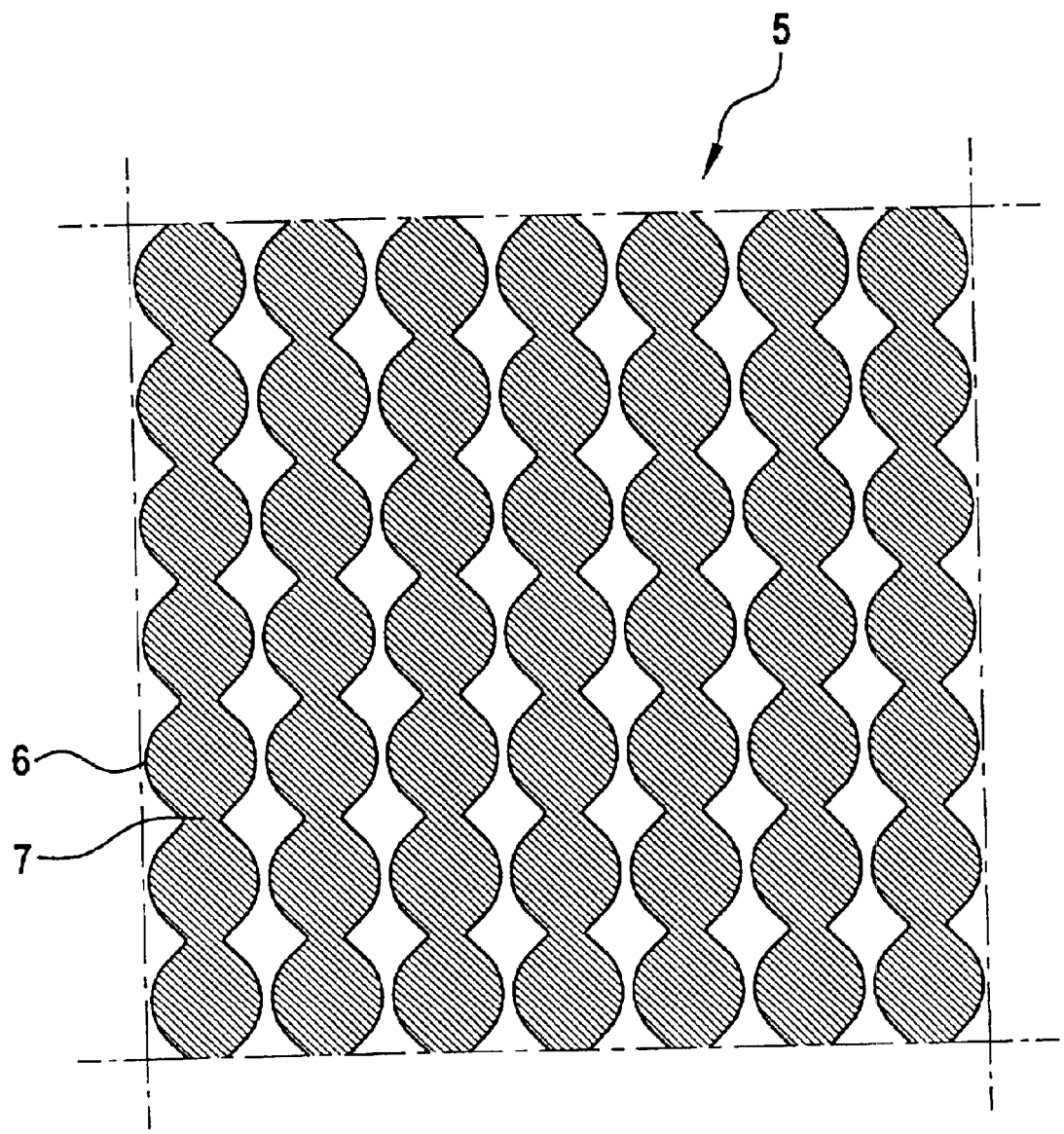
FIG. 2b is a top plan view of the electrodes applied to a second substrate, showing their orientation and shape.

FIG. 2b shows, similar to FIG. 2a, the second one of the two sheets of glass 1 or substrates, the second sheet of glass 1 being however turned through 90 degrees relative to the first sheet of glass 1.

Figure 3:
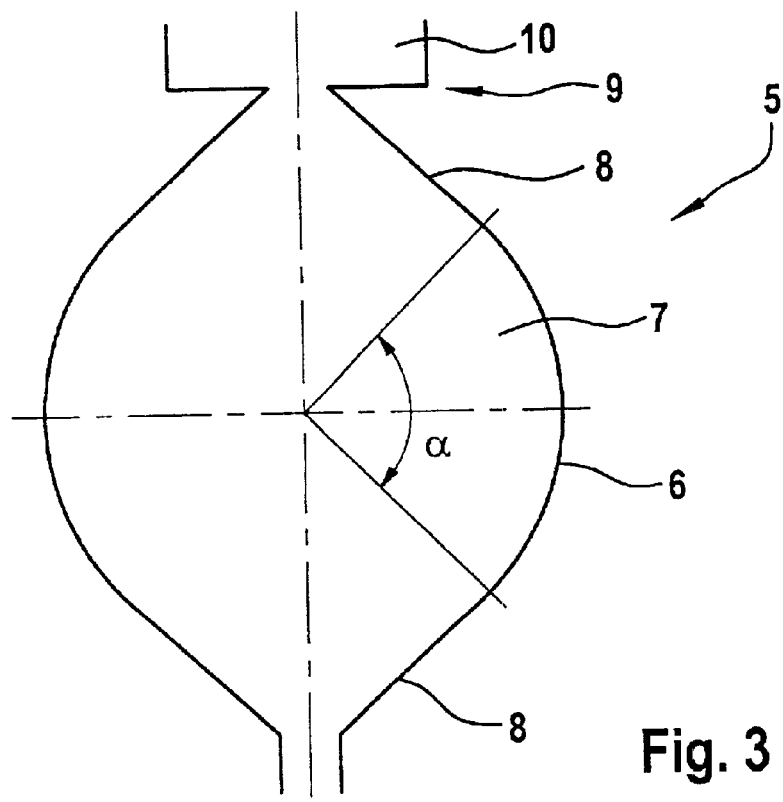
FIG. 3 is a view, on an enlarged scale, of a bulging section of an electrode to generate a circular pixel in accordance with an advantageous embodiment of the invention.

To produce pixels with a circular contour, the bulging sections 6 preferably possess the shape shown in FIG. 3 on an enlarged scale. The bulging sections 6 have their central portions bounded by a circular outer contour. The circular outer contour covers a sector of about α=90 degrees, with the bulging sections 6 being configured such that the sectors 7 are diametrically opposite to one another and have a common base point lying on the longitudinal axis of the corresponding conducting track 5. At the respective ends of the circular contour along the sectors 7 the contour continues in straight lines. The straight-line sections 8 terminate in connecting sections 9 inserted between two neighboring bulging sections 6 of an electrode 5. At the location where, due to a potential offset condition of two superposed electrodes 5, an overlap is precluded from occurring, the connecting section 9 has in one variant an enlarged cross-section 10, that is, a link of maximum possible width is established to the next bulging section 6. This results in a minimum possible resistance. In another variant the narrowing of the electrodes formed by the connecting sections is made as large as possible.

The circular-arc-shaped sectors 7 of two superposed electrodes 5 will add up to an ideal 360-degree circle when both substrates 1 are superposed without offset, that is, ideally. The overlap of the two electrodes is only effected with the circular-arc-shaped sectors 7. It is to be noted in this connection that the electrodes 5 on the one substrate have their longitudinal axes extend transversely to the electrodes' longitudinal axes on the other substrate, so that the bulging sections 6 of the electrodes 5 on the one substrate are turned through 90 degrees relative to the bulging sections 6 on the other substrate, the sectors 7 being hence complementary. In the area of overlap between the superposed electrodes 5 a segment of black or some other color is formed when an electric voltage is applied (crosshatched area in FIG. 4).

In manufacturing practice, however, inaccuracies in the superposition of the two substrates 1 are a frequent occurrence. One benefit derived from the present embodiment of the electrodes is that even a relative offset of the two substrates in the x and/or y direction, that is, in FIG. 4 in the horizontal or vertical direction, still enables a pixel to be produced which has an approximately circular outer contour. Hence an embodiment is provided which, even when allowance is made for manufacturing tolerances in the axial placement of the two substrates relative to each other, produces pixels which are close to the ideal of a circle and in particular devoid of protrusions caused by the overlap of the electrodes in the area of the connecting sections 9.

Figure 4:
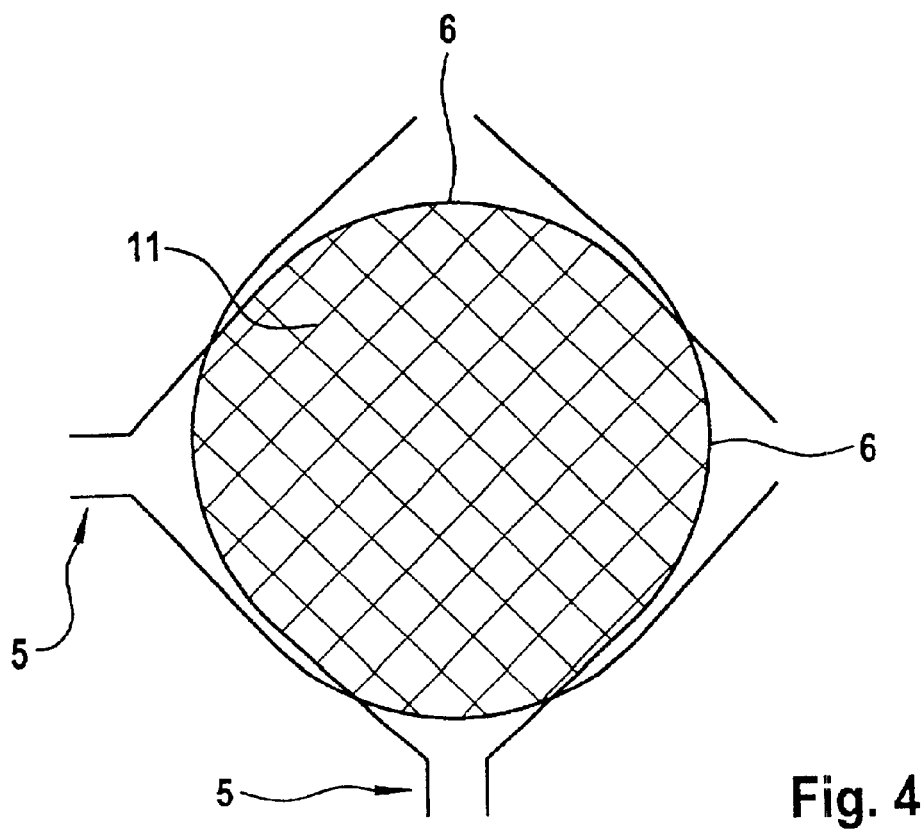
FIG. 4 is a schematic view of the area of overlap between two superposed electrodes of FIG. 3.

In FIG. 4 the crosshatched area shows a pixel produced with an offset in the directions x, y due to manufacturing tolerances. As a result of this offset, a pixel is formed whose outer contour is composed of different circular-arc-shaped sections (of different radii), or of circular-arc-shaped sections in combination with straight sections (the latter case being illustrated in FIG. 4). Owing to this overlap of the two electrodes 5 a corner is produced in those sections of the pixel's outer contour in which the one outer contour of the one electrode 5 merges into the other outer contour of the other electrode 5, said corner defining an obtuse internal angle and remaining hence close to the ideal of a circle. The permissible manufacturing tolerance for an axial shift of the substrates is smaller than or equal to half the radius of the sector 6. The included internal angle at such a corner of the outer contour is hence greater than or equal to 120 degrees, approximating to 180 degrees, provided that the manufacturing variation in the relative offset of the two substrates in the x and y direction is as small as possible.

Figure 5:
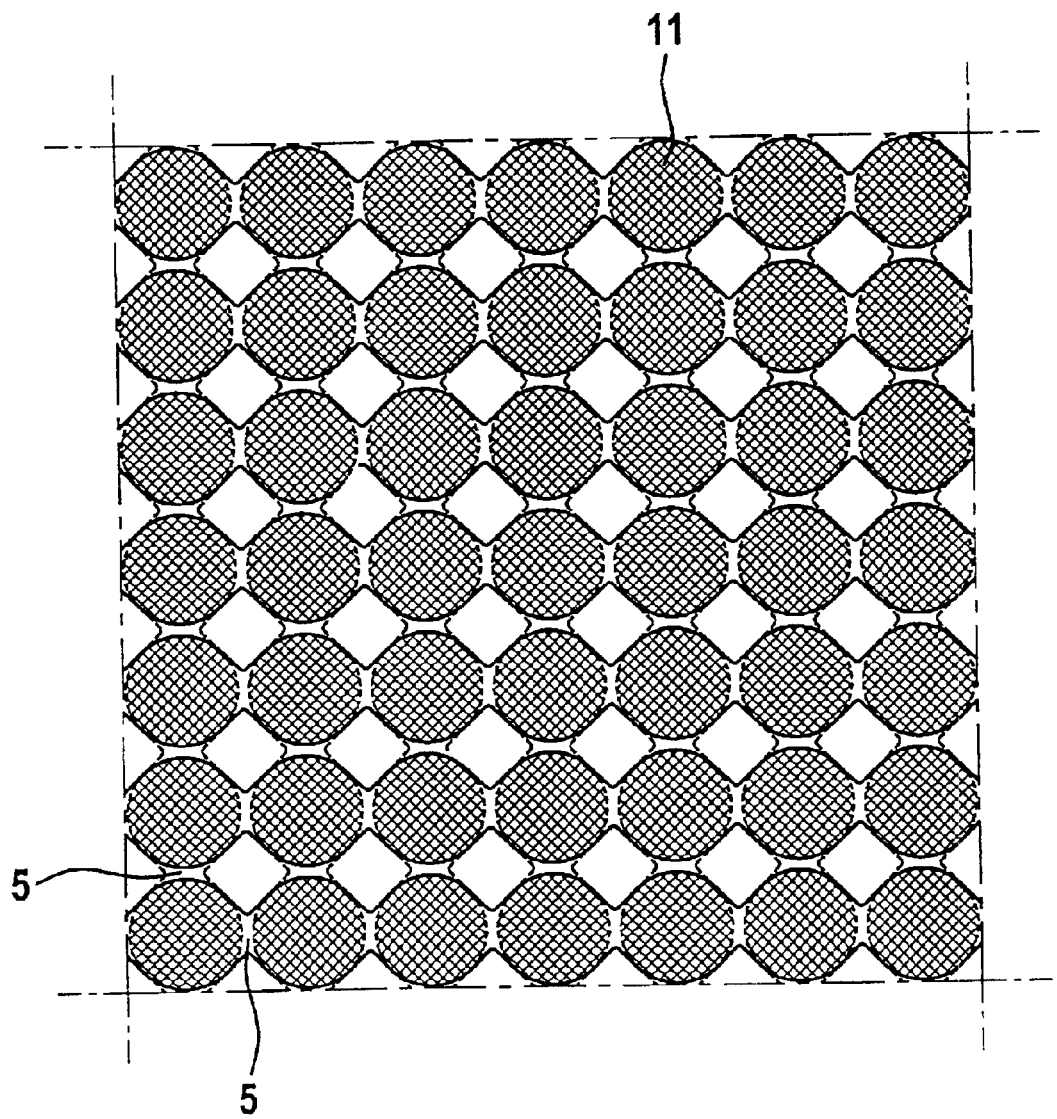
FIG. 5 is a schematic view of the pixels obtainable with the electrode array of FIGS. 2a and 2b, showing the overlap of the electrode rasters or substrates in the presence of an axial offset of the two substrates relative to one another.

The raster unit and the arrangement of the raster dots of the electrodes 5 on the one substrate corresponds to the raster of the electrodes 5 on the other sheet of glass, so that the bulging sections 6 overlap in accordance with a regular raster, enabling a regular matrix of pixels to be generated. FIG. 5 shows the pattern or raster of producible pixels defined by the area of overlap of the opposing electrodes 5. In a preferred embodiment provision is made for about 0.5 to 3, in particular 1 to 2, preferably 1.4 pixels per square millimeters.

Figure 6:
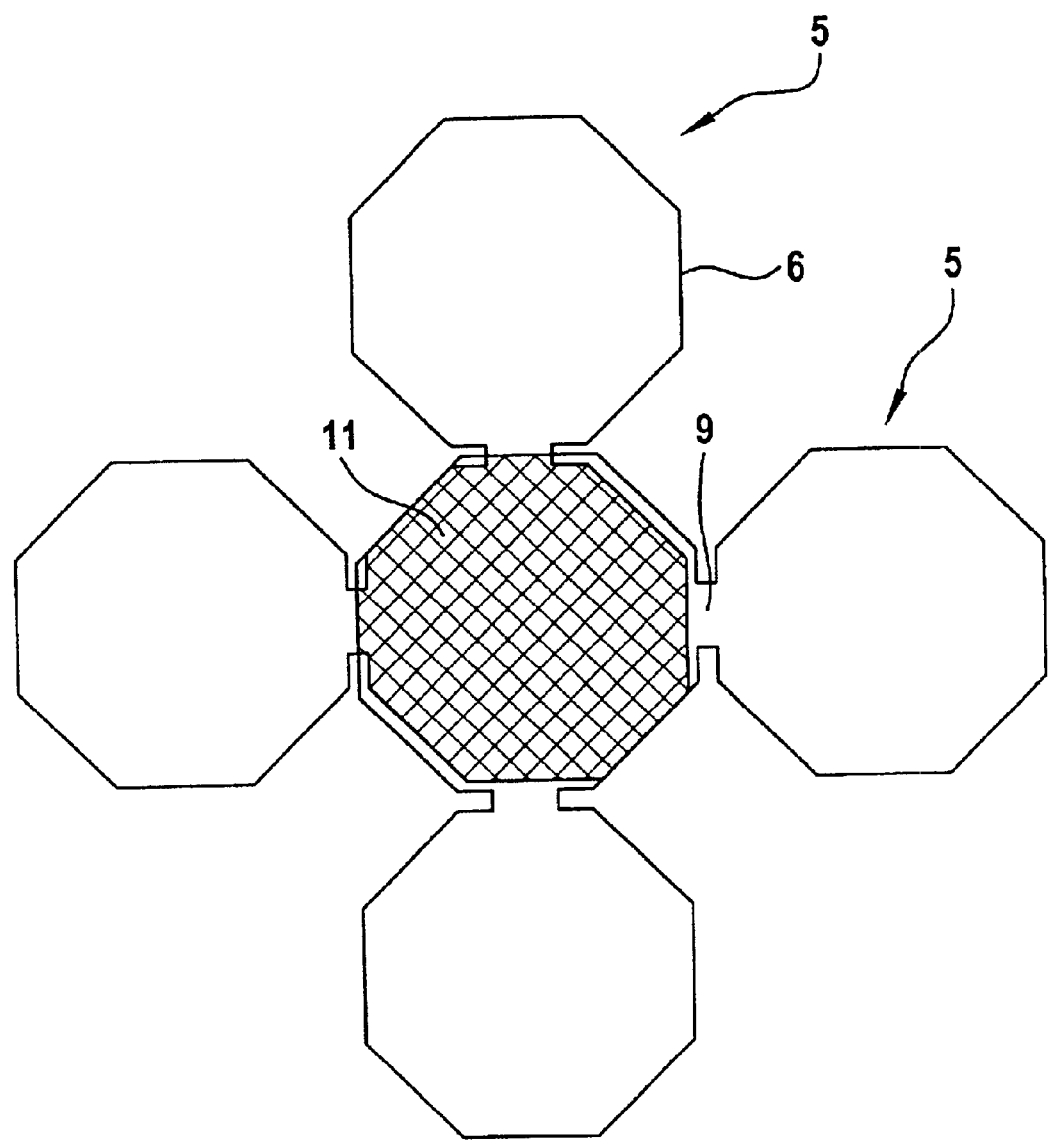
FIG. 6 is a schematic view of the area of overlap of two electrodes possessing polygonal bulges to generate octagonal pixels.

FIG. 6 shows another preferred embodiment. The basic structure of the liquid crystal display corresponds to that of FIG. 1. It differs by the configuration or shape of the electrodes 5. In this embodiment the bulging sections 6, rather than having a circular-segmental outer contour, are constructed in the from of octagons with sides of about equal length, as shown in FIG. 6. The bulging sections 6 are equally arranged in succession along straight lines, with the lines on the one substrate extending at right angles to the longitudinal axes of the electrodes on the other substrate. The opposed electrodes 5 have their bulging sections 6 likewise overlapping, which in this embodiment are octagonally shaped. Accordingly octagonal pixels can be produced.

The type of liquid crystal display herein described is particularly advantageous for use in blood pressure monitoring devices. Other applications in the field of appliances for personal use such as domestic appliances, cellular phones, organizers, personal computers, dry shaver, oral care appliances are equally advantageous.

What is claimed is:

1. A liquid crystal display having two opposed substrates (1), a liquid crystalline medium (2) contained between the substrates, and a plurality of overlapped electrodes (5) arranged on the substrates to produce a multiplicity of pixels (11),, wherein the overlapped electrodes (5) possess bulging sections (6) with arc-shaped sectors (7), as well as straight-line sections 8 merging into the arc-shaped sectors (7) such that the straight-line sections 8 form part of the contour of the overlapped electrodes in each of the pixels, and connecting sections (9) linking said bulging sections (6) in a string-type configuration.

2. The liquid crystal display as claimed in claim 1, wherein the overlapped electrodes (5) are configured in such fashion that the pixels (11) have roughly circular contours.

3. The liquid crystal display as claimed in claim 1, wherein the relative orientation of the overlapped electrodes (5) disposed on different substrates (1) being such that their bulging sections (6) lie opposite each other, turned through about 90° relative to one another, and adding up to form a pixel.

4. The liquid crystal display as claimed in claim 3, wherein the bulging sections (6) form diametrically opposed sectors (7), with a sector angle ($\alpha$) of at least about 90 degrees.

5. The liquid crystal display as claimed in claim 3, wherein the bulging sections (6) form diametrically opposed sectors (7), with a sector angle ($\alpha$) of about 90 degrees.

6. The liquid crystal display as claimed in claim 1, wherein the bulging sections (6) of the electrodes (11) which are complementary to form pixels (11) are configured in such fashion that in the presence of an offset of the substrates (1) in the two axial directions, which is due to manufacturing tolerances, pixels (11) are still producible whose outer contour includes circular sections and corners with obtuse include internal angles.

7. The liquid crystal display as claimed in claim 6, characterized in that the corners of the outer contour or the tangents applied to the corners define between them an internal angle of between 90° and 180°.

8. The liquid crystal display as claimed in claim 6, characterized in that the corners of the outer contour or the tangents applied to the corners define between them an internal angle of between 120° and 180°.

9. The liquid crystal display according to claim 1, wherein the overlapped electrodes (5) are configured in such a fashion that the pixels (11) have a contour in the form of a polygon with more than four sides.

10. The liquid crystal display as claimed in claim 9, wherein the overlapped electrodes (5) are configured in such fashion that the pixels (11) have a contour in the form of a polygon with rounded corners.

11. The liquid crystal display as claimed in claim 9, wherein neighboring sides of the polygon define between them an internal angle of $\geq 100$ degrees.

12. The liquid crystal display according to claim 9, wherein the overlapped electrodes (5) are configured in such a fashion that the pixels (11) have a contour in the form of an essentially octagonal contour.

13. The liquid crystal display as claimed in claim 12, wherein the overlapped electrodes (5) are configured in such fashion that the pixels (11) have a contour in the form of a polygon with rounded corners.

14. The liquid crystal display as claimed in claim 12, wherein neighboring sides of the polygon define between them an internal angle of $\geq 120$ degrees.

15. The liquid crystal display as claimed in claim 1, wherein the overlapped electrodes (5) possess bulging sections (6) with a polygonal outer contour, as well as connecting sections (9) linking said bulging sections in a string-type configuration, with the overlapped electrodes (5) disposed on different substrates (1) being configured such that their bulging sections lie opposite each configured such that their bulging sections lie opposite each other.

16. The liquid crystal display as claimed in claim 1, wherein the pixels (11) are arranged in a raster, with the raster distance between neighboring pixels amounting to between 0.5 mm and 1 mm.

17. The liquid crystal display as claimed in claim 16, wherein the pixels (11) are arranged in a raster, with the raster distance between neighboring pixels amounting to between 0.6 mm and 0.8 mm.

18. A liquid crystal display having two opposed substrates (1), a liquid crystalline medium (2) contained between the substrates, and a plurality of overlapped electrodes (5) arranged on the substrates to produce a multiplicity of pixels (11), wherein the connecting sections (9 have an enlarged cross-section (10) outside an area of overlap with the opposite electrode (5).

19. A liquid crystal display having two opposed substrates (1), a liquid crystalline medium (2) contained between the substrates, and a plurality of overlapped electrodes (5) arranged on the substrates to produce a multiplicity of pixels (11), wherein the overlapped electrodes (5) are configured in such fashion that the pixels (11) have round contours and the pixels (11) are arranged in a raster, with the raster distance between neighboring pixels amounting to between 0.5 mm and 1 mm.

* * * * *